UNITED STATES PATENT OFFICE.

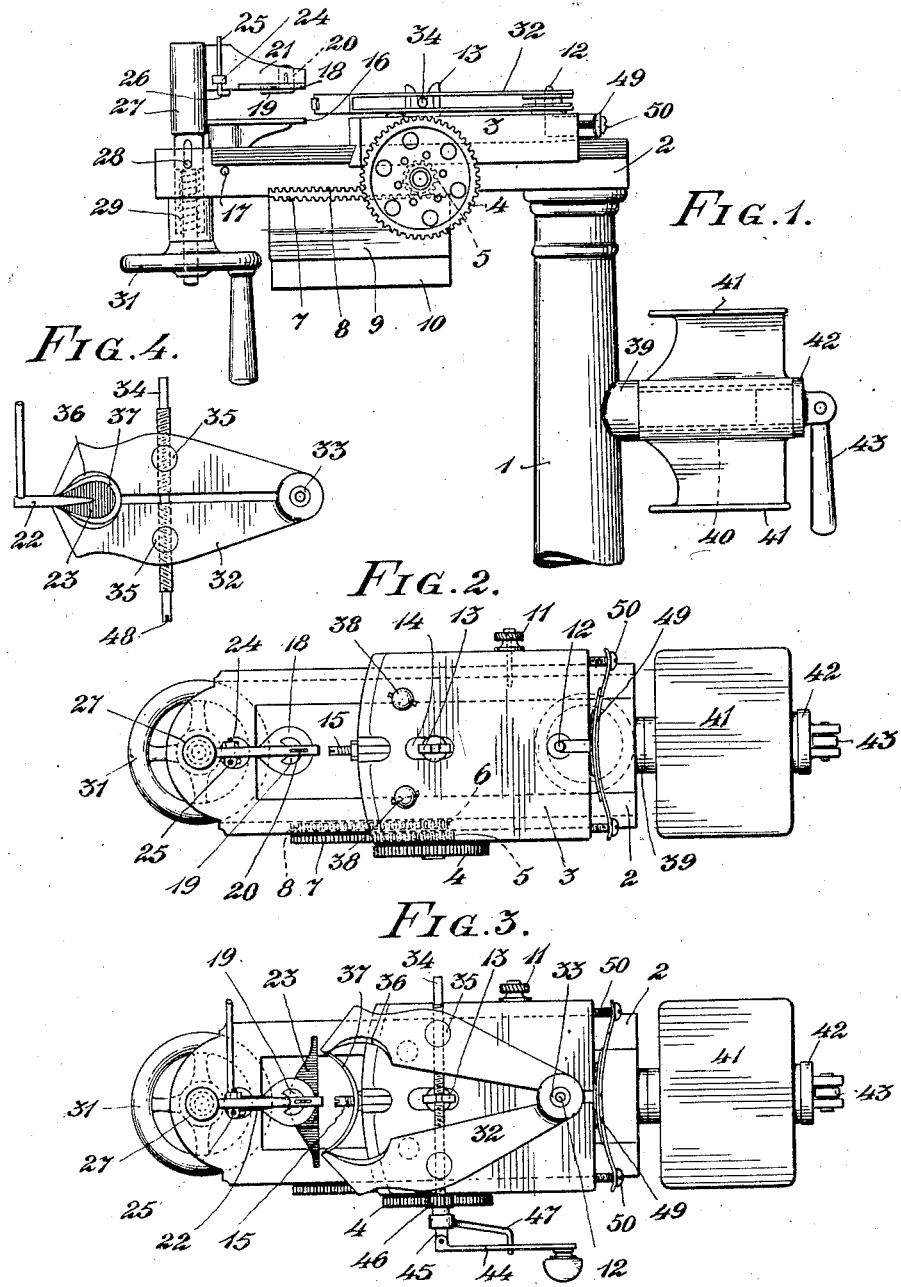

OCTAVIO EUGENIO BORGARELLO, OF BUENOS AIRES, ARGENTINA.

MACHINE FOR SECURING THE FELTS TO PIANO-HAMMERS.

1,327,018.  Specification of Letters Patent.  Patented Jan. 6, 1920.

Application filed June 6, 1917. Serial No. 173,107.

*To all whom it may concern:*

Be it known that I, OCTAVIO EUGENIO BORGARELLO, a citizen of the Argentine Republic, a mechanic, residing at Calle Maipú 671, Buenos Aires, Argentine Republic, have invented a new and useful Machine for Securing the Felts to Piano-Hammers, of which the following is a specification.

The present invention relates to an improved and novel machine for securing the felts to piano hammers by the use of which considerable savings may be made in the materials and time used, and, above all, an almost absolute uniformity in the dressing up of used piano hammers is obtained, to such an extent that the work performed by this machine to this regard, might be called perfect.

In the factories where piano actions are manufactured, the felts are applied to the hammers before gluing the heads thereof to the rods which in turn are secured to the balls. In this arrangement, said heads are placed one at the side of the other, so as to form a perfectly straight line or body, after the manner of a molding, to which is then applied the felt by means of a suitable press which at the same time uniformly submits the felt to the desired tension, throughout its extension. To the uniform degree of tension and pressure applied is due the evenness of sound which may be admired in high grade pianos.

This manner of affixing the felt doubtlessly is the best, most economical and rapid, but it may only be employed in connection with new hammer heads and in no way for dressing up the already used hammer heads of high grade pianos.

These latter hammer heads have heretofore been treated by means of more or less suitable apparatus or devices which in practice, among others, show the following drawbacks:

1. The considerable amount of felt wasted thereby (almost as much as that which finally remains affixed to the hammers), a fact which must be taken into account because of the high cost of the material.

2. When a complete set of felts is to be replaced, the time required by the different operations to be effected for that purpose by a skilled operator, is not less than two days' work.

3. The want of suitable means for stretching each felt with the same degree of force, since as the longitudinal shape of the felt is tapering, every one of its 88 sections, opposes a different degree of resistance and owing to this cause, the sounds emitted by the piano will be of different timbre or color, and, as already has been stated before, the felt is stretched on the hammer head instead of being molded thereon by pressure.

The machine which forms the subject matter of this invention, eliminates the above objections, with regard to the waste of material as well as to the speed of the work performed thereby. Said machine may be used in connection with any type of piano hammers, whatever be its construction or position within the instrument.

Said machine comprises a press for retaining in position the part of the hammer submitted to operation and a series of screw clamps or presses for molding the felt on the said parts and maintaining the same compressed in the desired shape till the cementing material employed has become dry.

Owing to this arrangement, no felt is wasted, as the same is cut to the width of the hammer and the molding and fitting on of the felt is performed within a very short time.

The use of the screw clamps or presses in the improved machine and the particular arrangement and adjustable operation of the said presses, permit of obtaining a uniform degree of hardness in the felt throughout the whole register and in consequence, the evenness of color or timbre in the sound of the notes.

In order to facilitate the clear understanding of this description, illustrative drawings have been appended thereto, in which:

Figure 1 shows a lateral elevation of a machine for molding and affixing the felts to piano hammers, constructed in accordance with my present invention.

Fig. 2 is a top plan view of the machine with the molding press removed.

Fig. 3 is also a top plan view of the machine, showing the molding press, the hammer piece and the felt placed in a suitable position for starting the operation.

Fig. 4 represents one of the molding presses as it retains the hammer in position after the felt having been affixed thereto.

In said drawings, 1 indicates the pillar or column which supports the entire machine and whose enlarged foot or base part has not been shown in the drawings as it may be of any suitable construction. On the upper end of the column is suitably secured a horizontal frame 2 on which slides the slide 3, guided by suitable angular lateral projections.

On the slide 3 is mounted a gear 4 having a shaft connected to but rotatable with respect to the slide 3. On this shaft are pinions 5 and 6 of different diameters which mesh respectively with the racks 7 and 8 formed integrally on a slide member 9 movable in a guide 10. The gear 4 is adapted to be driven as hereinafter more fully explained and the arrangement of pinions and racks as described effects opposite movements of the slide 3 and the slide 9 producing a slow and forcible advance of the former. Thus, for example, if one turn of the larger pinion 5 is equivalent to a linear travel of two units this travel might be either of the slide 9 or of the slide 3 if it were not for the pinion 6. This, however, is connected with the same parts and the single revolution thereof might, for example, be equivalent to a linear travel of one unit. This difference of travel caused by the two pinions effects a movement of the slide 9 in one direction and a contrary movement of the slide 3. In other words, if only the pinion 5 and its rack 7 were present the result would be that the slide 9 being lighter would move without any advance of the slide 3. However, if by any means we reduce the displacement of the slide 9 to one-half, then half of the movement effected by the pinion 5 would be utilized in advancing the slide 3 in a contrary direction. In the present instance this is effected by the pinion 6 and the rack 8.

The slide 3 carries one or more studs 11 which by entering into recesses formed at the respective side of the frame 2, serve as detents for limiting the forward motion and are used in accordance with the dimensions of the hammer or felt to be operated upon.

On the upper face of the slide 3 and for the purpose of maintaining in position the screw clamps or presses, are placed a stud 12 and a forked piece 13, held within a slot 14 in which they may be shifted. In front of the slide is fixed a screw 15 with its corresponding lock nut which serves as detent when the slide has arrived at the end or maximum of forward motion.

At the fore end of the frame 2 is arranged a clamping press formed by a base piece 16, with a face resembling in shape approximately that of a hammer and the spindle of which passes into the said frame where it is locked in position by means of the set screw 17. On said base plate moves the upper pressure plate 18, provided with a movable part 19 guided by an extension 20 in the interior of an opening with transverse stud, formed in the arm 21. The movable part 19 serves as a stop for determining the position of the hammer piece 22 to which is affixed the felt 23. On the same arm 21 is retained, by means of a clamp screw 24, the rod 25 provided with a bent lower end 26 for the purpose of determining the longitudinal position of the said piece 22. The arm 21 is secured to the upper end of the rod 27, guided in its movement by the stud 28 and caused to rise by the spring 29 conveniently arranged in the interior of the sleeve 30. The lower end of said rod or spindle 27 is threaded and acted upon by the hand wheel 31; by operating said hand wheel, the upper pressure plate 18 is caused to approach or recede from the lower base plate 16.

The molding clamps or presses consist of two jointed jaws 32, mounted on the support 33 and connected together by means of a rod 34, provided with a left and a right thread which meet at the middle of the rod. The threaded rod or screw 34 meshes with a thread provided in the bolts 35, suitably retained in each of the jaws 32. The fore end of said jaws is suitably shaped so as to correspond to the outer contour of the hammer and provided with a lining 36 of any convenient material. The points of both clamp jaws are firmly connected together by means of a strip or band of flexible, strong material 37 which operates to gradually mold the felt until it has taken the desired shape. Into the upper face of the slide 3 are sunk two revolving balls 38 so as to slightly protrude above the surface of the slide and on said balls rest the jaws of the molding clamp or press.

On the body part of the column 1 is formed an extension 39 to which is affixed a tubular piece 40 which serves as axle for the double support or shelf 41, destined to carry, within reach of the operator, the polishing tool on one side or shelf, and the felt cutting device on the other. For this purpose the shelf 41 is adapted to turn on its support 40, so that one or the other of said tools will be placed in suitable position for operation. When desired, the shelf may be locked against movement by means of the cap 42, screwed home onto the tubular section 40 and thereby caused to press against the sleeve of the support. The cap 42 is operated by a depending handle 43.

The means for operating the screw spindle of each molding press or clamp and also the cog wheel 4, consist of a particular crank 44 whose arm is pivoted to a bolt 45; a pinion 46, mounted to turn freely on said bolt, is adapted to slide endwise on the same, by means of a bent rod or arm 47 combined with the arm of the crank. On the end of screw spindle 34 is formed a notch 48 into which enters the inner end of the bolt 45 which thereby causes the screw spindle 34 to partake of its rotary motion. By means of this arrangement, the crank operates in a double way, that is to say, it simultaneously causes the rotation of the wheel 4 and of the screw spindle 34; when only this latter is to be operated, the wheels 4 and 46 are disengaged which may be obtained by simply pulling the arm 44 in an outward direction by oscillating the same on its pivot or joint at 45 and taking care at the same time not to shift the bolt out of mesh with the screw spindle 34.

For the purpose of uniformly distributing the pressure with which the felt is applied by the strip or band 37 against the end of the hammer 22, the bolt 12 is mounted movably, so that it may be shifted rearward under the action of a spring 49, the tension of which is adjusted by the screws 50. Owing to this arrangement, the pressure to which the felt is submitted, is in all cases equal to the strain exerted by said spring.

The manner of working of the apparatus is as follows:

The operation is started by positioning the hammer head 22 between the pressure plates 16 and 18, so as to cause the end thereof to set within the angular notch of the piece 19, while the side is made to come into contact with the bent part 26 whereby the said hammer piece will be perfectly centered with regard to the molding clamp.

The piece 22 being duly positioned, it is locked against movement by operating the hand wheel 31 which causes the rod 27 to descend till the plate 18 presses the piece 22 against the base plate 16.

Thereupon, the felt 23, cut to the desired shape, is placed in the position shown in Fig. 3; the part 19 does not interfere with this operation as it is automatically raised when introducing the felt.

One of the molding clamps, whose strip or band 37 should be of a length in accordance with the size of hammer to be formed, is placed in the position represented in Fig. 3, whereupon the handle 44 is inserted into the end of the screw spindle 34, taking care to keep the pinion 46 in engagement with the cog wheel 4. When the crank is now rotated, by the engagement of the pinions 5 and 6 with their respective racks 7 and 8, the slide is caused to move forward and the jaws of the molding clamp are partially closed. When the parts arrive at the predetermined position, the stud 11 is introduced into a hole formed in the frame 2 so that the slide will be locked against movement. In this position, the felt has already been partially bent by the strip or band 37, but there still remains between the felt and the piece 22 sufficient space for applying a coating of glue to said piece.

On applying the glue, the arm of the crank 44 is pulled outward, so as to disengage the pinion 46 from the cog wheel 4. The crank is then turned and by rotating the screw spindle 34, the clamping jaws are totally closed. While so doing, the felt gradually fits itself around the glued hammer piece, with such a degree of pressure that the glue will extend and penetrate to a certain extent into the felt so that upon drying, the latter will securely and permanently be maintained in the shape given thereto.

The operation being finished, the molding press is removed from the apparatus and suspended in a suitable room or place where it is left till the glue has become entirely dry, after which the screw spindle is unscrewed and the hammer with its felt 23 well molded and glued in position, is removed therefrom.

I declare what I claim as new and desire to secure by Letters Patent, is:—

1. In a machine for affixing felts to individual piano hammers, holding elements for engaging the sides of the hammer core and adapted to receive between them the felt, and clamping jaws adapted to close about the felt.

2. In a machine for affixing felts to individual piano hammers, holding elements for engaging the sides of the hammer core and adapted to receive between them the felt, a pair of clamping jaws adapted to close laterally about the core, a flexible member between the jaws, means for effecting relative longitudinal movement between the jaws and holding elements, and means for operating the jaws.

3. In a machine for affixing felts to individual piano hammers, holding elements for engaging the sides of the hammer core and adapted to receive between them the felt, a carriage movable toward and from said holding elements, a pair of jaws on said carriage adapted to close in about the hammer core, a flexible member extending between the jaws, and means to operate the jaws.

4. In a machine for affixing felts to individual piano hammers, holding elements engaging the sides of the hammer core and adapted to receive between them the felt, a carriage movable toward and from said holding elements, felt clamping means resiliently mounted on said carriage and including a pair of jaws, and a flexible member extending between them, and means for closing the jaws.

5. In a machine for affixing felts to piano hammers, a bed, a carriage movable therealong, a member slidable on said carriage, a spring against which it works, jaw carrying arms pivoted to said member, and a flexible band extending between the jaws.

6. In a machine for affixing felts to piano hammers, a bed, a carriage movable therealong, a member slidable on said carriage, a spring against which it works, jaw carrying arms pivoted to said member, a centrally located abutment for the felt movable with the carriage, and means for operating the jaws.

7. In a machine for affixing felts to piano hammers, a bed, a carriage, a rack carried by the bed, a shaft on the carriage having a pinion meshing with the rack and a gear wheel, a centrally located abutment for the felt, a pair of jaw-carrying arms pivoted to the carriage, right and left screws for operating the arms, and a crank shaft for turning the screws having a pinion shiftable therealong to throw it into mesh or out of mesh with said gear wheel.

8. In a machine for affixing felts to individual piano hammers in combination with means for holding a hammer core, a carriage movable toward and from the holding means, levers pivoted thereto having jaws to close about the head, a flexible strip extending between said jaws, means for swinging said levers and operating means adapted simultaneously to advance said carriage and operate said swinging means, and independently to operate the latter.

9. In a machine for affixing felts to piano hammers in combination with means for positioning the hammer core, a bed, a carriage movable along the bed, a post on the carriage, a pair of jaw-carrying levers having a hollow pivot adapted to fit over the post, a right and left threaded rod connecting said levers, and an open sided bearing on the carriage receiving said rod.

10. In a machine for affixing felts to piano hammers in combination with means for positioning the hammer core, a bed, a carriage, a gear on the carriage, a train between the gear and bed whereby revolution of the gear will move the carriage, a post on the carriage, a pair of jaw-carrying levers having a hollow pivot adapted to fit over the post, a right and left threaded rod connecting said levers, an open-sided bearing on the carriage receiving said rod, a crank having a shaft adapted to be engaged with said rod and carrying a slidable pinion adapted in one position to mesh with said gear.

11. In a machine for affixing felts to individual piano hammers, core holding means comprising a pair of elements adapted to close on the sides of a hammer core, one of said elements having a displaceable gage projecting from the face thereof to position the core and a gage associated with said means for engaging the core remote from the first.

12. In a machine for affixing felts to individual piano hammers a support of a size to receive laterally the core and felt, an adjustable rod having an overhanging plate opposed to said head whereby to permit the positioning of a hammer core or its supporting stem or handle and a gage carried rearwardly of said plate.

13. In machines for molding and affixing the felts to piano hammers, a molding press or clamp, substantially consisting of two jointed jaws with a hollow joint, so as to allow of the passage therethrough of the movable bolt arranged on the slide of the machine, said jaws being connected together at the middle by means of a transverse screw spindle with left and right threads, the respective threads operating within bolts mounted to oscillate in the middle part of said jaws, the inner ends of said jaws being conveniently shaped and lined with a suitable resilient material and connected together at their fore ends by a strong flexible strip or band which, when the jaws are being closed, surround or embrace the felt and maintain the same suitably molded against the central part of the hammer, substantially as described and for the purpose set forth.

OCTAVIO EUGENIO BORGARELLO.

Witnesses:
 A. L. BELLE,
 R. ROUSEN.